United States Patent
Han et al.

(10) Patent No.: US 11,436,540 B2
(45) Date of Patent: Sep. 6, 2022

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Guangyao Han, Beijing (CN); Xingbo Chen, Beijing (CN); Guobin Xie, Beijing (CN); Yanjiang Liu, Beijing (CN); Fu Qu, Beijing (CN); Liqiang Xue, Beijing (CN); Jin Zhang, Beijing (CN); Wenjing Qin, Beijing (CN); Xiaolan Luo, Beijing (CN); Hongjiang Du, Beijing (CN); Zeqing Jiang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 495 days.

(21) Appl. No.: 16/722,649

(22) Filed: Dec. 20, 2019

(65) Prior Publication Data
US 2020/0401950 A1 Dec. 24, 2020

(30) Foreign Application Priority Data
Jun. 19, 2019 (CN) .......................... 201910531479.4

(51) Int. Cl.
  G06N 20/20 (2019.01)
  G06F 9/38 (2018.01)
  G06K 9/62 (2022.01)
(52) U.S. Cl.
  CPC ........... *G06N 20/20* (2019.01); *G06F 9/3867* (2013.01); *G06K 9/6262* (2013.01)

(58) Field of Classification Search
CPC ...... G06N 20/20; G06N 20/00; G06F 9/3867; G06K 9/6262; G06K 9/6256
See application file for complete search history.

(56) References Cited

U.S. PATENT DOCUMENTS

| 2017/0017896 | A1 | 1/2017 | Hamann et al. |
| 2017/0351689 | A1* | 12/2017 | Vasudevan ............ G06F 16/355 |
| 2019/0113973 | A1* | 4/2019 | Coleman ................. H04L 12/16 |

(Continued)

FOREIGN PATENT DOCUMENTS

| CN | 105912500 A | 8/2016 |
| CN | 107563417 A | 1/2018 |

(Continued)

OTHER PUBLICATIONS

Machine translation for CN 110110858 (Year: 2019).*
Machine translation for WO 2020/011068 (Year: 2018).*

(Continued)

*Primary Examiner* — Qian Yang
(74) *Attorney, Agent, or Firm* — von Briesen & Roper, s.c.

(57) ABSTRACT

Embodiments of the present disclosure relate to a method and apparatus for generating information. The method may include: receiving a modeling request; determining a target number of initial machine learning pipelines according to a type of training data and a model type; and executing following model generation steps using the target number of initial machine learning pipelines: generating a target number of new machine learning pipelines based on the target number of initial machine learning pipelines; performing model training based on the training data, the target number of initial machine learning pipelines, and the target number of new machine learning pipelines, to generate trained models; evaluating the obtained trained models respectively according to the evaluation indicator; determining whether a preset training termination condition is reached; and determining, in response to determining the preset training ter- (Continued)

mination condition being reached, a target trained model from the obtained trained models according to evaluation results.

15 Claims, 4 Drawing Sheets

(56) References Cited

U.S. PATENT DOCUMENTS

| | | | | |
|---|---|---|---|---|
| 2019/0138946 | A1* | 5/2019 | Asher | G06N 5/04 |
| 2019/0147371 | A1 | 5/2019 | Deo et al. | |
| 2020/0027210 | A1* | 1/2020 | Haemel | G06F 9/5038 |

FOREIGN PATENT DOCUMENTS

| | | | |
|---|---|---|---|
| CN | 108710949 A | | 10/2018 |
| CN | 109325541 A | | 2/2019 |
| CN | 109409528 A | | 3/2019 |
| CN | 110110858 | * | 4/2019 |
| JP | 2019511037 A | | 4/2013 |
| JP | 2016099738 A | | 5/2016 |
| JP | 2016523402 A | | 8/2016 |
| WO | WO 2020/011068 | * | 7/2018 |

OTHER PUBLICATIONS

Lee et al. "A Deep Learning Model Generation Method for Code Reuse and Automatic Machine Learning", RACS '18: Proceedings of the 2018 Conference on Research in Adaptive and Convergent Systems• (Year: 2018).*

South Korean Notice of Allowance; dated Aug. 19, 2021.

Chinese Office Action for related Chinese Application No. 201910531479.4; dated Nov. 13, 2020.

* cited by examiner

METHOD AND APPARATUS FOR GENERATING INFORMATION

CROSS-REFERENCE TO RELATED APPLICATIONS

This application claims priority to Chinese Application No. 201910531479.4, filed on Jun. 19, 2019 and entitled "Method and Apparatus for Generating Information," the entire disclosure of which is hereby incorporated by reference.

TECHNICAL FIELD

Embodiments of the present disclosure relate to the field of computer technology, and specifically to a method and apparatus for generating information.

BACKGROUND

In the field of machine learning, automatic modeling has become a hotspot due to high barriers for modeling using machine learning algorithms and high time cost of manually adjusting model parameters. The automatic modeling is simple to use. On one hand, it is easy for some people with weak foundation in machine learning to start using the automatic modeling quickly. On the other hand, the time for manually adjusting the model process and parameters can be greatly saved. The automatic modeling for a target is still in the developing phase, and a lot of research is in the exploration phase.

SUMMARY

Embodiments of the present disclosure propose a method and apparatus for generating information.

In a first aspect, an embodiment of the present disclosure provides a method for generating information, the method including: receiving a modeling request, the modeling request including training data, a model type, a target number, and an evaluation indicator; determining a target number of initial machine learning pipelines according to a type of the training data and the model type, the initial machine learning pipelines being used for model training; and executing following model generation steps using the target number of initial machine learning pipelines: generating the target number of new machine learning pipelines based on the target number of initial machine learning pipelines; performing model training based on the training data, the target number of initial machine learning pipelines, and the target number of new machine learning pipelines, to generate trained models; evaluating the obtained trained models respectively according to the evaluation indicator; determining whether a preset training termination condition is reached; and determining, in response to determining that the preset training termination condition is reached, a target trained model from the obtained trained models according to evaluation results.

In some embodiments, the method further includes: selecting, in response to determining that the preset training termination condition is not reached, the target number of machine learning pipelines from the target number of initial machine learning pipelines and the target number of new machine learning pipelines as new initial machine learning pipelines according to the evaluation results, and continuing to execute the model generation steps.

In some embodiments, the method further includes: generating a model file for the target trained model, and evaluating the target trained model; and pushing the model file and the evaluation result of the target trained model.

In some embodiments, the modeling request further includes a maximum number of iterations, and the training termination condition includes: a number of executions of the model generation steps reaches the maximum number of iterations; or in response to determining that the number of the executions of the model generation steps does not reach the maximum number of iterations, and the evaluation result of an optimal trained model obtained by a preset number of continuous executions of the model generation steps is unchanged.

In some embodiments, the generating the target number of new machine learning pipelines based on the target number of initial machine learning pipelines includes: selecting, according to a preset exchange ratio, initial machine learning pipelines from the target number of initial machine learning pipelines to form an initial machine learning pipeline subset, and executing following data exchange steps based on every two initial machine learning pipelines in the initial machine learning pipeline subset: determining whether two models corresponding to the two selected initial machine learning pipelines are the same; exchanging, in response to determining the same, model parameters of the two models to obtain two new machine learning pipelines; exchanging, in response to determining different, the models corresponding to the two selected initial machine learning pipelines to obtain two new machine learning pipelines; and generating, for an initial machine learning pipeline in the target number of initial machine learning pipelines except the initial machine learning pipelines included in the initial machine learning pipeline subset, a new machine learning pipeline based on the excluded initial machine learning pipeline.

In some embodiments, the generating the target number of new machine learning pipelines based on the target number of initial machine learning pipelines includes: selecting two initial machine learning pipelines from the target number of initial machine learning pipelines, and executing following data exchange steps: determining whether two models corresponding to the two selected initial machine learning pipelines are the same; exchanging, in response to the same, model parameters of the two models to obtain two new machine learning pipelines; exchanging, in response to determining different, the models corresponding to the two selected initial machine learning pipelines to obtain two new machine learning pipelines; and selecting two initial machine learning pipelines that do not undergo the data exchange steps from the target number of initial machine learning pipelines, and continuing to execute the data exchange steps.

In some embodiments, the initial machine learning pipeline includes at least one data processing phase and one model training phase; and the generating the target number of new machine learning pipelines based on the target number of initial machine learning pipelines includes: selecting, for a machine learning pipeline in the target number of initial machine learning pipelines, a preset number of parts of models corresponding to the at least one data processing phase and/or one model training phase of the initial machine learning pipeline for changing to generate a new machine learning pipeline.

In a second aspect, an embodiment of the present disclosure provides an apparatus for generating information, the apparatus including: a receiving unit, configured to receive a modeling request, the modeling request including training data, a model type, a target number, and an evaluation indicator; a determining unit, configured to determine a target number of initial machine learning pipelines according a type of the training data and the model type, the initial machine learning pipelines being used for model training; and a generating unit, configured to execute model generation steps using the target number of initial machine learning pipelines, the generating unit including: a first generating module, configured to generate the target number of new machine learning pipelines based on the target number of initial machine learning pipelines; a second generating module, configured to perform model training based on the training data, the target number of initial machine learning pipelines, and the target number of new machine learning pipelines, to generate trained models; an evaluating module, configured to evaluate the obtained trained models respectively according to the evaluation indicator; a condition determining module, configured to determine whether a preset training termination condition is reached; and a model determining module, configured to determine, in response to determining that the preset training termination condition is reached, a target trained model from the obtained trained models according to evaluation results.

In some embodiments, the apparatus further includes: a selecting unit configured to select, in response to determining that the preset training termination condition is not reached, the target number of machine learning pipelines from the target number of initial machine learning pipelines and the target number of new machine learning pipelines as new initial machine learning pipelines according to the evaluation results, and continue to execute the model generation steps.

In some embodiments, the apparatus further includes: a file generating unit configured to generate a model file for the target trained model, and evaluate the target trained model; and a push unit configured to push the model file and the evaluation result of the target trained model.

In some embodiments, the modeling request further includes a maximum number of iterations, and the training termination condition includes: a number of executions of the model generation steps reaches the maximum number of iterations; or in response to determining that the number of the executions of the model generation steps does not reach the maximum number of iterations, and the evaluation result of an optimal trained model obtained by a preset number of continuous executions of the model generation steps is unchanged.

In some embodiments, the first generating module is further configured to: select, according to a preset exchange ratio, initial machine learning pipelines from the target number of initial machine learning pipelines to form an initial machine learning pipeline subset, and execute following data exchange steps based on every two initial machine learning pipelines in the initial machine learning pipeline subset: determining whether two models corresponding to the two selected initial machine learning pipelines are the same; exchanging, in response to determining the same, model parameters of the two models to obtain two new machine learning pipelines; exchanging, in response to determining different, the models corresponding to the two selected initial machine learning pipelines to obtain two new machine learning pipelines; and generate, for an initial machine learning pipeline in the target number of initial machine learning pipelines except the initial machine learning pipelines included in the initial machine learning pipeline subset, a new machine learning pipeline based on the excluded initial machine learning pipeline.

In some embodiments, the first generating module is further configured to: select two initial machine learning pipelines from the target number of initial machine learning pipelines, and execute following data exchange steps: determining whether two models corresponding to the two selected initial machine learning pipelines are the same; exchanging, in response to the same, model parameters of the two models to obtain two new machine learning pipelines; exchanging, in response to determining different, the models corresponding to the two selected initial machine learning pipelines to obtain two new machine learning pipelines; and select two initial machine learning pipelines that do not undergo the data exchange steps from the target number of initial machine learning pipelines, and continue to execute the data exchange steps.

In some embodiments, the initial machine learning pipeline includes at least one data processing phase and one model training phase; and the first generating module is further configured to: select, for a machine learning pipeline in the target number of initial machine learning pipelines, a preset number of parts of models corresponding to the at least one data processing phase and/or one model training phase of the initial machine learning pipeline for changing to generate a new machine learning pipeline.

In a third aspect, an embodiment of the present disclosure provides a device, the device including: one or more processors; and a storage apparatus, storing one or more programs, where the one or more programs, when executed by the one or more processors, cause the one or more processors to implement any implementation of the method according to the first aspect.

In a fourth aspect, an embodiment of the present disclosure provides a computer readable medium, storing a computer program thereon, where the computer program, when executed by a processor, implements any implementation of the method according to the first aspect.

According to a method and apparatus for generating information provided by embodiments of the present disclosure, a modeling request is received, a target number of initial machine learning pipelines are determined according to the type of training data and the model type in the modeling request, and following model generation steps are executed using the target number of initial machine learning pipelines: first, generating a target number of new machine learning pipelines based on the target number of initial machine learning pipelines; next, performing model training based on the training data, the target number of initial machine learning pipelines, and the target number of new machine learning pipelines to generate trained models; then, evaluating the obtained trained models respectively according to the evaluation indicator; and finally, determining whether a preset training termination condition is reached, and if the preset training termination condition is reached, determining a target trained model from the obtained trained models according to the evaluation results, thereby realizing automatic generation of the model.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
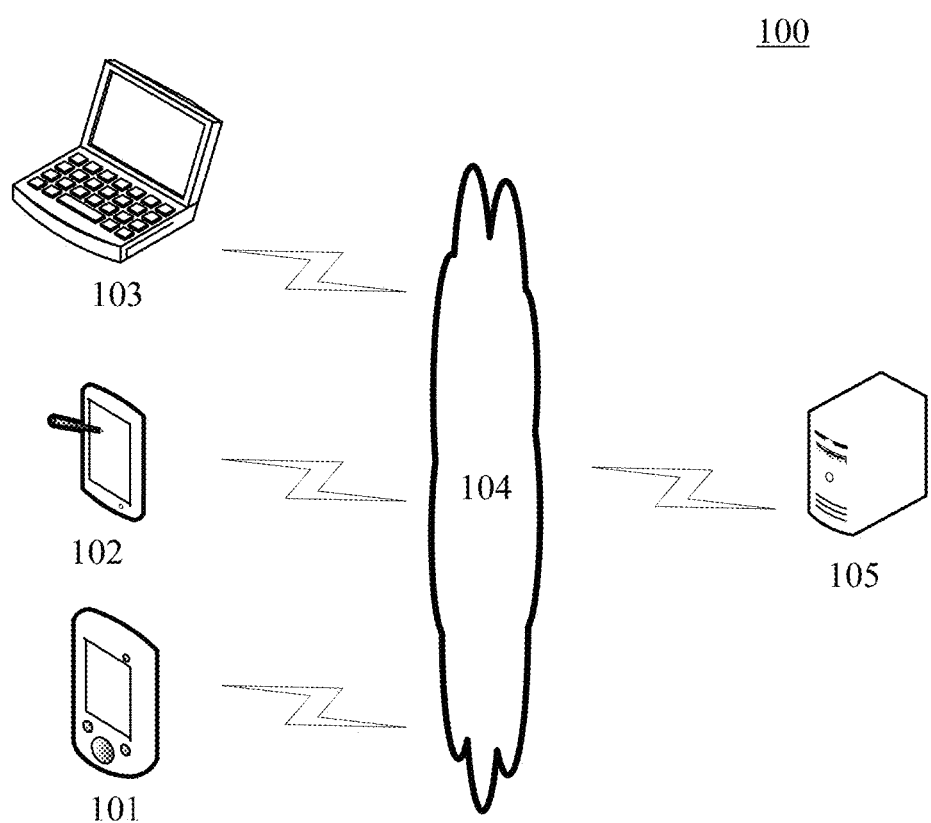
FIG. 1 is a diagram of an example system architecture in which embodiments of the present disclosure may be implemented.

FIG. 1 shows an example system architecture 100 in which a method for generating information or an apparatus for generating information according to embodiments of the present disclosure may be implemented.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

A user may interact with the server 105 by using the terminal device 101, 102 or 103 through the network 104 to receive or send messages, etc. The terminal device 101, 102 or 103 may be installed with various communication client applications, such as automatic modeling software, web browser applications, or social platform software.

The terminal device 101, 102 or 103 may be hardware or software. When the terminal device 101, 102 or 103 is hardware, the terminal device may be various electronic devices having a display screen and supporting information input, including but not limited to a smart phone, a tablet computer, a laptop portable computer, a desktop computer, or the like. When the terminal device 101, 102 or 103 is hardware, the terminal device may be installed in the above-listed electronic devices. The terminal device may be implemented as a plurality of software programs or software modules (e.g., for providing distributed services), or as a single software program or software module. Specific limitations are not provided here.

The server 105 may be a server providing various services, for example, a backend server for generating a target trained model according to a modeling request sent by the terminal device 101, 102 or 103. The backend server may analyze the received modeling request, and feed back the processing result (e.g., the generated model) to the terminal device 101, 102 or 103. It should be noted that the server 105 may be hardware or software. When the server 105 is hardware, the server 105 may be implemented as a distributed server cluster composed of a plurality of servers, or as a single server. When the server 105 is software, the server 105 may be implemented as a plurality of software programs or software modules (e.g., for providing distributed services), or as a single software program or software module. Specific limitations are not provided here.

It should be understood that the numbers of the terminal devices, the network and the server in FIG. 1 are merely illustrative. Any number of terminal devices, networks and servers may be provided based on actual requirements.

It should be noted that the method for generating information according to embodiments of the present disclosure may be executed by the terminal device 101, 102 or 103, or by the server 105. Accordingly, the apparatus for generating information may be provided in the terminal device 101, 102 or 103, or in the server 105, Further, referring to FIG. 2, a flow 200 of a method for generating information according to an embodiment of the present disclosure is shown. The method for generating information includes the following steps.

Step 201: receiving a modeling request.

In the present embodiment, the executing body (for example, the terminal device 101, 102 or 103, or the server 105 shown in FIG. 1) of the method for generating information may receive the modeling request. As an example, when the executing body is a terminal device, the executing body may directly receive the modeling request inputted by a user; when the executing body is a server, the executing body may receive the modeling request through a wired or wireless connection from a terminal used by the user to input information. Here, the modeling request includes training data, a model type, a target number, an evaluation indicator, etc. The training data may indicate data for training a machine learning model. The model type may indicate the type of a model to be obtained by the user. As an example, the model type may include a binary classification model, a multi-classification model, a clustering model, a regression model, etc. The target number may be used to indicate the number of initial machine learning pipelines generated according to the type of training data. The type of training data may include a string type and a numerical type. The evaluation indicator may be used to evaluate the model obtained by training in the model training process.

In practice, for each model type, the executing body may preset a plurality of different evaluation indicators for the user to select one therein when inputting the modeling request. As an example, the evaluation indicator set for the binary classification model may include, but is not limited to, AUC (Area Under Curve, area enclosed by an ROC curve and the coordinate axis), accuracy, pr curve, logloss, precision, recall, f1 value, ks value, etc. The evaluation indicator preset for the multi-classification model may include, but is not limited to, accuracy, precision, recall, f1 value, etc. The evaluation indicator set for the clustering model may include, but is not limited to, a contour coefficient. The evaluation indicator set for the regression model may include, but is not limited to, RMSE (Root Mean Squared Error), MSE (Mean Squared Error), MAE (Mean Absolute Error), MAPE (Mean Absolute Percentage Error), SSREG (sum of squares for regression), R2, etc.

Step 202: determining a target number of initial machine learning pipelines according to the type of training data and the model type.

In the present embodiment, the executing body may determine the target number of initial machine learning pipelines according to the type of training data and the model type in the modeling request. As an example, the type of training data may include a character string type and a numerical type. Here, the initial machine learning pipelines may be used for model training. The initial machine learning pipelines may include at least one data processing phase and one model training phase. The model training phase is used to train a machine learning model, and the type of the model trained in the model training phase is the same as the above model type.

Generally, the generation process of a machine learning model begins with data collection, and the trained machine learning model is obtained after several phases of source data extraction, transformation, preprocessing, feature engineering, feature selection, model training, etc. The whole process is similar to a pipeline work. Each phase may be regarded as a work flow phase of the pipeline work. The pipeline work may also be regarded as a machine learning pipeline. The machine learning pipelines may combine at least one data processing phase and one model training phase orderly to form a work flow for training the machine learning model.

In practice, for each type of training data, the executing body may preset a plurality of phase combinations, each phase combination includes a plurality of phases, and each phase combination can construct a machine learning pipeline. In this way, the executing body may select (for example, randomly select), according to the type of training data and the model type received, one of the plurality of phase combinations set for the type of training data to construct the machine learning pipelines. As an example, for the numerical type, the executing body may preset the following phase combinations: 1) feature vectorization+model training; 2) data binning+feature vectorization+model training; 3) feature vectorization+feature engineering+model training; 4) feature vectorization+feature selection+model training; 5) data binning+feature vectorization+feature engineering+model training; 6) data binning+feature vectorization+feature selection+model training; 7) feature vectorization+feature selection+feature engineering+model training; 8) data binning+feature vectorization+feature selection+feature engineering+model training. As an example, for the string type, the executing body may preset the following phase combinations: 1) numeralization+one-hot encoding+feature vectorization+model training; 2) numeralization+one-hot encoding+data binning+feature vectorization+model training; 3) numeralization+one-hot encoding+feature vectorization+feature engineering+model training; 4) numeralization+one-hot encoding+feature vectorization+feature selection+model training; 5) numeralization+one-hot encoding+data binning+feature vectorization+feature engineering+model training; 6) numeralization+one-hot encoding+data binning+feature vectorization+feature selection+model training; 7) numeralization+one-hot encoding+feature vectorization+feature selection+feature engineering+model training; 8) numeralization+one-hot encoding+data binning+feature vectorization+feature selection+feature engineering+model training. In practice, the type of a model corresponding to the model training phase of each initial machine learning pipeline in the determined target number of initial machine learning pipelines is the same as the model type in the modeling request.

Here, some phases in the phase combinations may also include a plurality of modes for the executing body to select (for example, randomly select). As an example, the feature engineering may include, but is not limited to, numeralization, one-hot encoding, normalization, standardization, regularization, IDF (Inverse Document Frequency) calculation, etc. The data binning may include, but is not limited to, equidistant binning and equal frequency binning. The feature selection may include, but is not limited to, PCA (Principal Components Analysis) dimensionality reduction, chi-square feature selection, polynomial feature nonlinear transformation, etc. The model trained in the model training phase may include a binary classification model, a multi-classification model, a regression model, a clustering model, etc. The classification model may include logistic regression, random forest, decision tree, naive Bayesian algorithm, xgboost (eXtreme Gradient Boosting) algorithm, etc. The regression model may include linear regression, random forest regression, decision tree regression, xgboost regression, etc. The clustering model may include k-means clustering, Gaussian mixture clustering, etc.

Step 203: executing following model generation steps 2031 to 2035 using the target number of initial machine learning pipelines.

In the present embodiment, the executing body may execute the following model generation steps 2031 to 2034 using the target number of initial machine learning pipelines generated in step 202.

Step 2031: generating a target number of new machine learning pipelines based on the target number of initial machine learning pipelines.

In the present embodiment, the executing body may generate a target number of new machine learning pipelines based on the target number of initial machine learning pipelines. For example, if the target number is 10, the executing body may generate 10 new machine learning pipelines based on the 10 initial machine learning pipelines.

In some optional implementations of the present embodiment, step 2031 may be implemented as follows.

Step S1: selecting, according to a preset exchange ratio, initial machine learning pipelines from the target number of initial machine learning pipelines to form an initial machine learning pipeline subset, and executing the following data exchange steps S11 to S13 based on every two initial machine learning pipelines in the initial machine learning pipeline subset.

In this implementation, the exchange ratio may be preset in the executing body. In this way, the executing body can select, according to the exchange ratio, an even number of initial machine learning pipelines from the target number of initial machine learning pipelines to form an initial machine learning pipeline subset. As an example, the executing body may calculate the product of the exchange ratio and the target number. If the obtained product is an even number, the executing body randomly selects the product number of initial machine learning pipelines from the target number of initial machine learning pipelines to form an initial machine learning pipeline subset. If the product is odd, the executing body randomly selects the product plus one (or minus one) number of initial machine learning pipelines from the target number of initial machine learning pipelines to form an initial machine learning pipeline subset. Thereafter, the executing body may randomly pair the even number of initial machine learning pipelines in the initial machine learning pipeline subset, and each pair of initial machine learning pipelines executes the following data exchange steps S11 to S13.

Step S11: determining whether two models corresponding to the two selected initial machine learning pipelines are the same.

In this implementation, the executing body may determine whether the two models corresponding to the two selected initial machine learning pipelines in each pair of initial machine learning pipelines are the same. Here, the model corresponding to an initial machine learning pipeline may indicate a machine learning model to be trained in the model training phase of the initial machine learning pipeline. As an example, the executing body may judge whether the two models are the same through model structures. If the model structures are the same, it can be determined that the two models are the same. If the model structures are different, it can be determined that the two models are different.

Step S12: exchanging, in response to determining the same, model parameters of the two models to obtain two new machine learning pipelines.

In this implementation, if the two models corresponding to the two initial machine learning pipelines are the same, the executing body may exchange the model parameters of the two models. As an example, all model parameters of the two models may be exchanged, or part of the model parameters may be exchanged randomly. In this way, two new machine learning pipelines can be obtained. For example, it is assumed that the initial machine learning pipeline 1 includes data binning+feature vectorization+decision tree model training, and the initial machine learning pipeline 2 includes feature vectorization+feature selection+feature engineering+decision tree model training. Since the model corresponding to the initial machine learning pipeline 1 and the model corresponding to the initial machine learning pipeline 2 are both decision tree models, the model parameters of the decision tree models can be exchanged to obtain two new machine learning pipelines in which the model parameters are changed.

Step S13: exchanging, in response to determining different, the models corresponding to the two selected initial machine learning pipelines to obtain two new machine learning pipelines.

In this implementation, if the two models corresponding to the two initial machine learning pipelines are different, the executing body may exchange the models corresponding to the two selected initial machine learning pipelines to obtain two new machine learning pipelines.

Step S2: generating, for an initial machine learning pipeline in the target number of initial machine learning pipelines except the initial machine learning pipelines included in the initial machine learning pipeline subset, a new machine learning pipeline based on the excluded initial machine learning pipeline.

In this implementation, for each initial machine learning pipeline in the target number of initial machine learning pipelines except the initial machine learning pipelines included in the initial machine learning pipeline subset, the executing body may generate a new machine learning pipeline based on the excluded initial machine learning pipeline. As an example, the executing body may randomly select one or more data processing phases in the initial machine learning pipeline to make changes, e.g., random change of modes, random change of parameters, etc.

In this implementation, the new machine learning pipelines may be generated by crossover and mutation similar to the Genetic Algorithm (GA). The idea of crossover in the genetic algorithm indicates that the combination of excellent individuals has a high probability of generating more excellent individuals, so that the individuals tend to optimal values. The idea of mutation in the genetic algorithm indicates that individual mutations may produce more excellent individuals or worse individuals, the worse individuals may be thrown away in later iterations, and the excellent individuals may be retained to produce more excellent individuals. The mutation may cause the optimization path to jump out of the local optimal value and to tend to the global optimal value. The models and parameters corresponding to the machine learning pipelines are modified by means of the ideas of crossover and mutation in the genetic algorithm, so that new machine learning pipelines are continuously generated in the automatic modeling process for subsequent selection and use. Later, better models may be generated by looping execution of the model generation steps.

In some optional implementations of the present embodiment, step 2031 may specifically include the following steps.

Step 1: selecting two initial machine learning pipelines from the target number of initial machine learning pipelines, and executing the following data exchange steps 1) to 3).

In this implementation, the target number is an even number. The executing body may randomly select two initial machine learning pipelines from the target number of initial machine learning pipelines, and execute the data exchange steps 1) to 3).

Step 1): determining whether the two models corresponding to the two selected initial machine learning pipelines are the same.

In this implementation, the executing body may determine whether the two models corresponding to the two selected initial machine learning pipelines are the same.

Step 2): exchanging, in response to the same, model parameters of the two models to obtain two new machine learning pipelines.

In this implementation, if it is determined that the two models corresponding to the two selected initial machine learning pipelines are the same, the executing body may exchange the model parameters of the two models to obtain two new machine learning pipelines.

Step 3): exchanging, in response to determining different, the models corresponding to the two selected initial machine learning pipelines to obtain two new machine learning pipelines.

In this implementation, if it is determined that the two models corresponding to the two selected initial machine learning pipelines are different, the executing body may exchange the models corresponding to the two selected initial machine learning pipelines to obtain two new machine learning pipelines.

Step 2: selecting two initial machine learning pipelines that do not undergo the data exchange steps from the target number of initial machine learning pipelines, and continuing to execute the data exchange steps.

In this implementation, the executing body may further reselect two initial machine learning pipelines that do not undergo the above data exchange steps from the target number of initial machine learning pipelines, and continue to execute the above data exchange steps until all of the target number of initial machine learning pipelines undergo the above data exchange steps.

In some optional implementations of the present embodiment, step 2031 may further include the following steps: selecting, for a machine learning pipeline in the target number of initial machine learning pipelines, a preset number of parts of models corresponding to at least one data processing phase and/or one model training phase of the initial machine learning pipeline for changing to generate a new machine learning pipeline.

In this implementation, for each machine learning pipeline in the target number of initial machine learning pipelines, the executing body may randomly select a preset number of parts of models corresponding to at least one data processing phase and/or one model training phase of the initial machine learning pipeline for changing, for example, randomly changing modes, randomly changing parameters, etc., to generate a new machine learning pipeline.

Step 2032: performing model training based on the training data, the target number of initial machine learning pipelines, and the target number of new machine learning pipelines to generate trained models.

In the present embodiment, the executing body may perform model training based on the training data, the target number of initial machine learning pipelines, and the target number of new machine learning pipelines to generate trained models. Specifically, for each machine learning pipeline in the target number of initial machine learning pipelines and the target number of new machine learning pipelines, the executing body may input the training data as input data into the machine learning pipeline, and the input data is sequentially processed in a manner of flow by each data processing phase in the machine learning pipeline, that is, after the data is processed by one data processing phase, the processing result is transmitted to next data processing phase for further processing. Thus, the model training is completed to obtain trained models. Here, a trained model may be obtained through a machine learning pipeline. In practice, in order to improve the efficiency of model training, the model training may be performed on the target number of initial machine learning pipelines and the target number of new machine learning pipelines in a distributed manner. As an example, the present embodiment may be designed based on a Spark framework. Spark is a fast and universal calculation engine designed for large-scale data processing. Thus, the training efficiency of the models can be greatly improved.

Step 2033: evaluating the obtained trained models respectively according to the evaluation indicator.

In the present embodiment, the executing body may evaluate each of the obtained trained models according to the evaluation indicator in the modeling request to obtain an evaluation result.

Step 2034: determining whether a preset training termination condition is reached.

In the present embodiment, the executing body may store a preset training termination condition and judge whether the current condition reaches the training termination condition. Here, the training termination condition may be set according to actual needs.

In some optional implementations of the present embodiment, the modeling request received in step 201 may further include a maximum number of iterations. Here, the maximum number of iterations may indicate a maximum value set by the user to allow the executions of the above model generation steps.

The training termination condition in step 2034 may include: 1) the number of executions of the model generation steps reaches the maximum number of iterations; 2) in response to determining the number of the executions of the model generation steps does not reach the maximum number of iterations, and the evaluation result of the optimal trained model obtained by a preset number of continuous executions of the model generation steps is unchanged.

In this implementation, each time the model generation steps are executed, the executing body may determine whether the total number of executions of the model generation steps reaches the maximum number of iterations. If the maximum number of iterations is reached, the executing body may determine that the preset training termination condition 1) is reached at the current time. If the maximum number of iterations is not reached, the executing body may further judge, according to the evaluation result of step 2033, whether the evaluation result of the optimal trained model obtained each time by a preset number of continuous executions of the model generation steps is changed, and if unchanged, the executing body may determine that the preset training termination condition 2) is reached at the current time. Here, the optimal trained model may indicate an optimal trained model determined according to the evaluation indicator in the modeling request after each execution of the model generation steps.

Step 2035: determining, in response to determining that the preset training termination condition is reached, a target trained model from the obtained trained models according to evaluation results.

In the present embodiment, if it is determined that the current condition reaches the preset training termination condition, the executing body may determine the target trained model from the obtained trained models according to the evaluation results. For example, the executing body may sort all the trained models obtained in step 2032 according to the evaluation results in order of superior to poor, and select the trained model ranked first as the target trained model.

In some optional implementations of the present embodiment, the method for generating information may further include the following steps.

First, a model file is generated for the target trained model, and the target trained model is evaluated.

In the present embodiment, after the target trained model is determined, the executing body may further generate the model file for the target trained model. As an example, the model file may be a pmml (Predictive Model Markup Language) file. At the same time, the executing body may also evaluate the target trained model using a variety of preset evaluation indicators. Here, the evaluation indicators used for evaluating the target trained model may be the same as or different from the evaluation indicator in the modeling request.

Then, the model file and the evaluation result of the target trained model are pushed.

In the present embodiment, the executing body may push the generated model file and the evaluation result of the target trained model. As an example, the executing body may push the model file and the evaluation result of the target trained model to the user who sends the modeling request. Here, the executing body may also push information of each data processing phase of the machine learning pipeline corresponding to the target trained model to the user. The machine learning pipeline corresponding to the target trained model indicates the machine learning pipeline for generating the target trained model.

Figure 3:
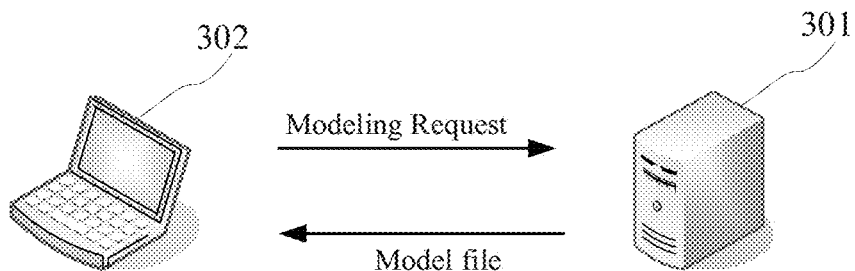
FIG. 3 is a schematic diagram of an application scenario of the method for generating information according to an embodiment of the present disclosure.

Further referring to FIG. 3, FIG. 3 is a schematic diagram of an application scenario of the method for generating information according to the present embodiment. In the application scenario of FIG. 3, a server 301 receives a modeling request sent by a user through a terminal device 302. The modeling request includes training data, a model type, a target number 15, and an evaluation indicator. Thereafter, the server 301 determines 15 initial machine learning pipes according to the type of training data and the model type. The server 301 executes the following model generation steps using the 15 initial machine learning pipelines: first, generating 15 new machine learning pipelines based on the 15 initial machine learning pipelines; next, performing model training based on the training data, the 15 initial machine learning pipelines, and the 15 new machine learning pipelines to generate 30 trained models; then, evaluating the obtained 30 trained models respectively according to the evaluation indicator; finally, determining whether a preset training termination condition is reached; and if the preset training termination condition is reached, determining an optimal trained model as a target trained model from the obtained 30 trained models according to the evaluation results, and sending a model file corresponding to the target trained model to the terminal device 302.

The method provided by embodiments of the present disclosure automatically generates a target trained model according to a modeling request sent by a user, thereby realizing automatic generation of the model.

Figure 4:
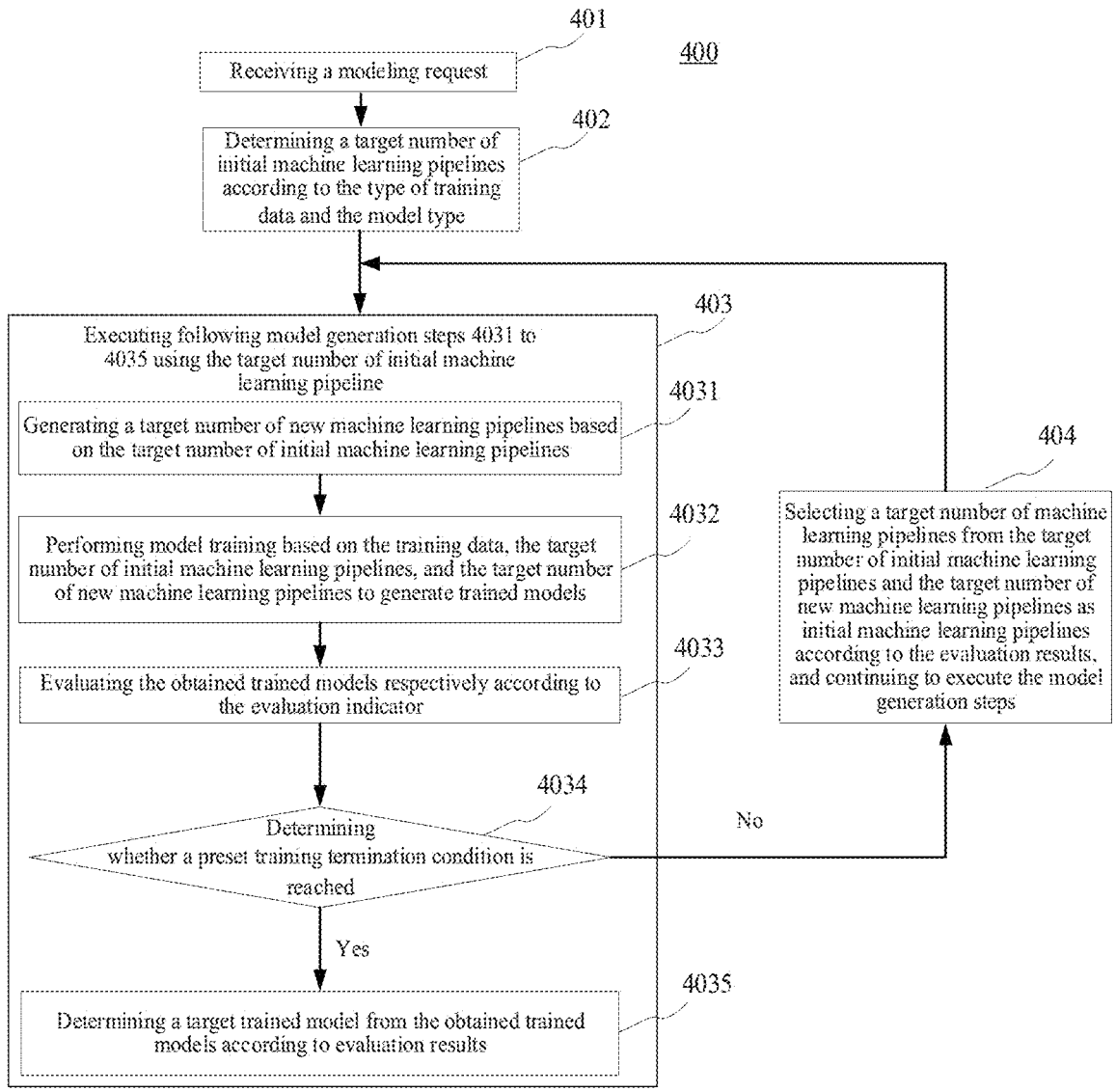
FIG. 4 is a flowchart of the method for generating information according to another embodiment of the present disclosure.

Further referring to FIG. 4, a flow 400 of another embodiment of the method for generating information is shown. The flow 400 of the method for generating information includes the following steps.

Step 401: receiving a modeling request.

Figure 2:
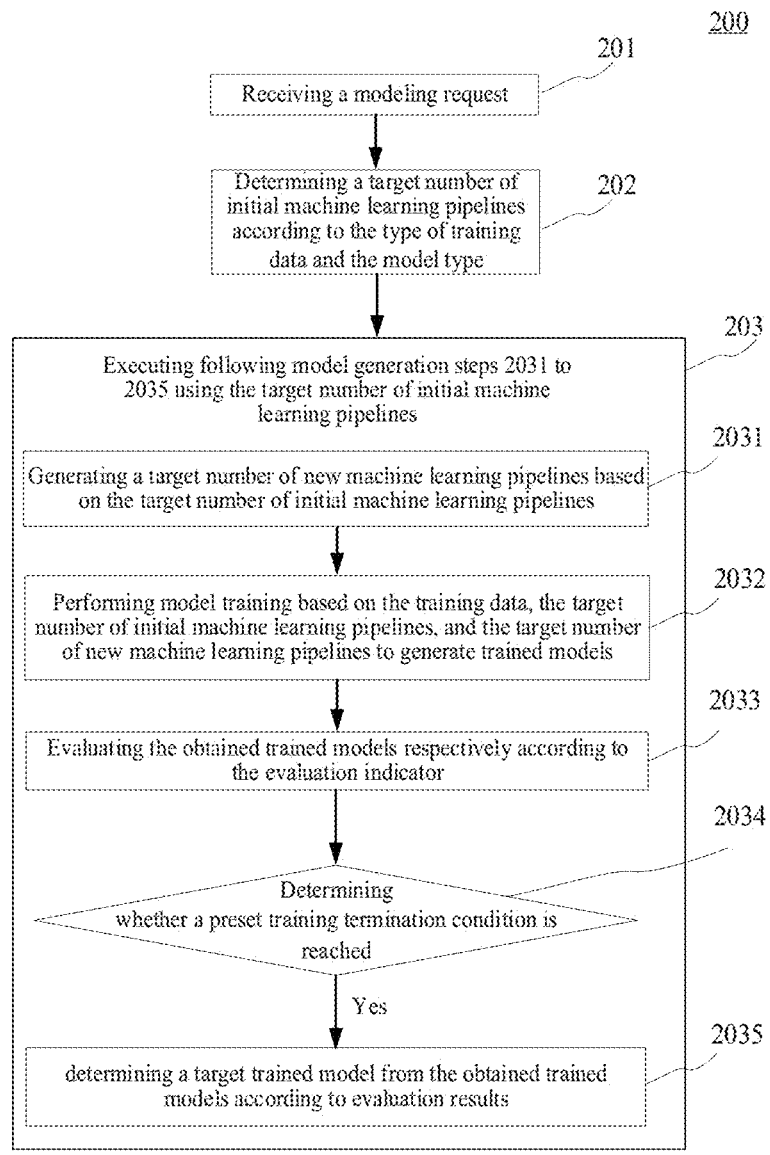
FIG. 2 is a flowchart of a method for generating information according to an embodiment of the present disclosure.

In the present embodiment, step 401 is similar to step 201 of the embodiment shown in FIG. 2, and details are not described herein again.

Step 402: determining a target number of initial machine learning pipelines according to the type of training data and the model type.

In the present embodiment, step 402 is similar to step 202 of the embodiment shown in FIG. 2, and details are not described herein again.

Step 403: executing following model generation steps 4031 to 4035 using the target number of initial machine learning pipelines.

In the present embodiment, the executing body may execute the following model generation steps 4031 to 4035 using the target number of initial machine learning pipelines.

Step 4031: generating a target number of new machine learning pipelines based on the target number of initial machine learning pipelines.

In the present embodiment, step 4031 is similar to step 2031 of the embodiment shown in FIG. 2, and details are not described herein again.

Step 4032: performing model training based on the training data, the target number of initial machine learning pipelines, and the target number of new machine learning pipelines to generate trained models.

In the present embodiment, step 4032 is similar to step 2032 of the embodiment shown in FIG. 2, and details are not described herein again.

Step 4033: evaluating the obtained trained models respectively according to the evaluation indicator.

In the present embodiment, step 4033 is similar to step 2033 of the embodiment shown in FIG. 2, and details are not described herein again.

Step 4034: determining whether a preset training termination condition is reached.

In the present embodiment, step 4034 is similar to step 2034 of the embodiment shown in FIG. 2, and details are not described herein again.

Step 4035: determining, in response to determining that the preset training termination condition is reached, a target trained model from the obtained trained models according to evaluation results.

In the present embodiment, step 4035 is similar to step 2035 of the embodiment shown in FIG. 2, and details are not described herein again.

Step 404: selecting, in response to determining that the preset training termination condition is not reached, a target number of machine learning pipelines from the target number of initial machine learning pipelines and the target number of new machine learning pipelines as initial machine learning pipelines according to the evaluation results, and continuing to execute the model generation steps.

In the present embodiment, if it is determined that the preset training termination condition is not reached, the executing body may select a target number of machine learning pipelines from the target number of initial machine learning pipelines and the target number of new machine learning pipelines as new initial machine learning pipelines according to the evaluation results obtained in step 4033, and continue to execute the model generation steps. As an example, the executing body may sort the target number of initial machine learning pipelines and the target number of new machine learning pipelines in order of superior to poor according to the evaluation results of the generated trained models, and select the machine learning pipelines ranked in front of a target number as new initial machine learning pipelines. For example, it is assumed that the target number is 10, the initial machine learning pipelines include machine learning pipelines 0-9, and the new machine learning pipelines include machine learning pipelines 10-19. Then, the machine learning pipelines 0-9 and the machine learning pipelines 10-19 may be sorted in order of superior to poor according to the evaluation results of the generated trained models, and the 10 machine learning pipelines ranked in the top 10 are selected as new initial machine learning pipelines.

It can be seen from FIG. 4 that, compared with the embodiment corresponding to FIG. 2, the flow 400 of the method for generating information in the present embodiment highlights the step of selecting, when the training termination condition is not reached, the target number of machine learning pipelines from the target number of initial machine learning pipelines and the target number of new machine learning pipelines as initial machine learning pipelines, and continuing to execute the model generation steps. Thus, the scheme described in the present embodiment can iteratively execute the model generation steps, thereby improving the effect of automatically generating a model.

Figure 5:
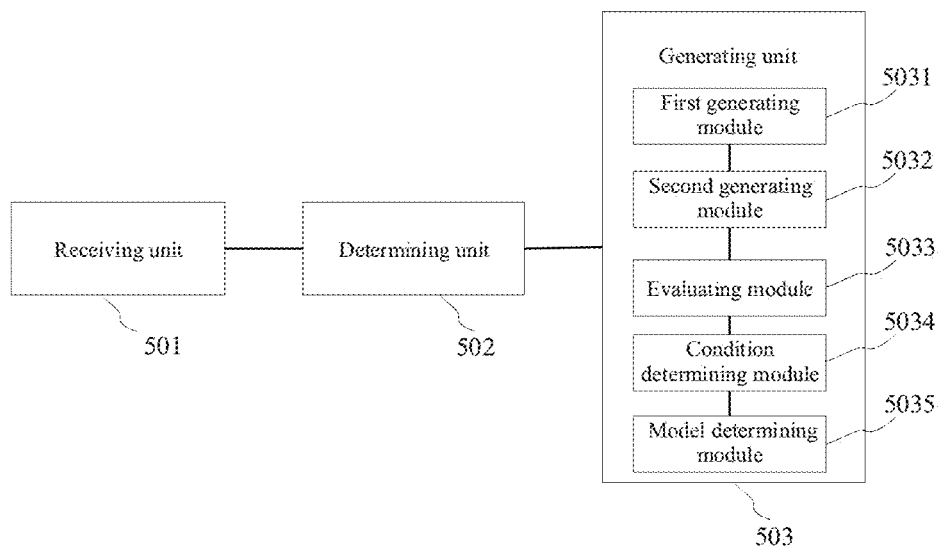
FIG. 5 is a schematic structural diagram of an apparatus for generating information according to an embodiment of the present disclosure.

Further referring to FIG. 5, as an implementation of the method shown in the above figures, an embodiment of the present disclosure provides an apparatus for generating information. An embodiment of the apparatus may correspond to the embodiment of the method shown in FIG. 2, and the apparatus may be applied to various electronic devices.

As shown in FIG. 5, the apparatus 500 for generating information in the present embodiment includes: a receiving unit 501, a determining unit 502, and a generating unit 503. The receiving unit 501 is configured to receive a modeling request, where the modeling request includes training data, a model type, a target number, and an evaluation indicator; the determining unit 502 is configured to determine a target number of initial machine learning pipelines according to a type of the training data and the model type, where the initial machine learning pipelines are used for model training; the generating unit 503 is configured to execute model generation steps using the target number of initial machine learning pipelines, where the generating unit 503 includes: a first generating module 5031, configured to generate the target number of new machine learning pipelines based on the target number of initial machine learning pipelines; a second generating module 5032, configured to perform model training based on the training data, the target number of initial machine learning pipelines, and the target number of new machine learning pipelines, to generate trained models; an evaluating module 5033, configured to evaluate the obtained trained models respectively according to the evaluation indicator; a condition determining module 5034, configured to determine whether a preset training termination condition is reached; and a model determining module 5035, configured to determine, in response to determining that the preset training termination condition is reached, a target trained model from the obtained trained models according to evaluation results.

In the present embodiment, the specific processing of the receiving unit 501, the determining unit 502, and the generating unit 503 of the apparatus 500 for generating information and the technical effects thereof may be referred to the related description in step 201, step 202 and step 203 in the corresponding embodiment of FIG. 2, respectively. The description will not be repeated here.

In some optional implementations of the present embodiment, the apparatus 500 further includes: a selecting unit (not shown) configured to select, in response to determining that the preset training termination condition is not reached, the target number of machine learning pipelines from the target number of initial machine learning pipelines and the target number of new machine learning pipelines as new initial machine learning pipelines according to the evaluation results, and continue to execute the model generation steps.

In some optional implementations of the present embodiment, the apparatus 500 further includes: a file generating unit (not shown) configured to generate a model file for the target trained model, and evaluate the target trained model; and a push unit (not shown) configured to push the model file and the evaluation result of the target trained model.

In some optional implementations of the present embodiment, the modeling request further includes a maximum number of iterations, and the training termination condition includes: a number of executions of the model generation steps reaches the maximum number of iterations; or in response to determining that the number of the executions of the model generation steps does not reach the maximum number of iterations, and the evaluation result of an optimal trained model obtained by a preset number of continuous executions of the model generation steps is unchanged.

In some optional implementations of the present embodiment, the first generating module 5031 is further configured to: select, according to a preset exchange ratio, initial machine learning pipelines from the target number of initial machine learning pipelines to form an initial machine learning pipeline subset, and execute following data exchange steps based on every two initial machine learning pipelines in the initial machine learning pipeline subset: determining whether two models corresponding to the two selected initial machine learning pipelines are the same; exchanging, in response to determining the same, model parameters of the two models to obtain two new machine learning pipelines; exchanging, in response to determining different, the models corresponding to the two selected initial machine learning pipelines to obtain two new machine learning pipelines; and generating, for an initial machine learning pipeline in the target number of initial machine learning pipelines except the initial machine learning pipelines comprised in the initial machine learning pipeline subset, a new machine learning pipeline based on the excluded initial machine learning pipeline.

In some optional implementations of the present embodiment, the first generating module 5031 is further configured to: select two initial machine learning pipelines from the target number of initial machine learning pipelines, and execute following data exchange steps: determining whether two models corresponding to the two selected initial machine learning pipelines are the same; exchanging, in response to the same, model parameters of the two models to obtain two new machine learning pipelines; exchanging, in response to determining different, the models corresponding to the two selected initial machine learning pipelines to obtain two new machine learning pipelines; and selecting two initial machine learning pipelines that do not undergo the data exchange steps from the target number of initial machine learning pipelines, and continuing to execute the data exchange steps.

In some optional implementations of the present embodiment, the initial machine learning pipeline includes at least one data processing phase and one model training phase; and the first generating module 5031 is further configured to: select, for a machine learning pipeline in the target number of initial machine learning pipelines, a preset number of parts of models corresponding to the at least one data processing phase and/or one model training phase of the initial machine learning pipeline for changing to generate a new machine learning pipeline.

Figure 6:
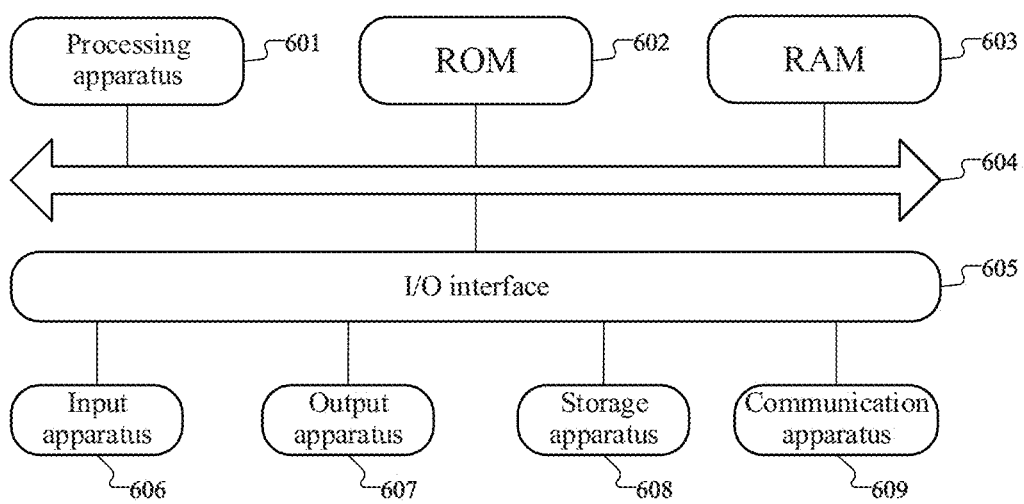
FIG. 6 is a schematic structural diagram of a computer system adapted to implement a device of embodiments of the present disclosure.

Referring to FIG. 6 below, a schematic structural diagram of an electronic device (e.g., the server or the terminal device in FIG. 1) 600 adapted to implement some embodiments of the present disclosure is shown. The electronic device shown in FIG. 6 is merely an example, and should not limit the functions and scope of use of embodiments of the present disclosure.

As shown in FIG. 6, the electronic device 600 may include a processing apparatus (e.g., a central processing apparatus, or a graphics processor) 601, which may execute various appropriate actions and processes in accordance with a program stored in a read only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal displayer (LCD), a speaker, a vibrator, or the like; a storage apparatus 608 including a tape, a hard disk, or the like; and a communication apparatus 609. The communication apparatus 609 may allow the electronic device 600 to exchange data with other devices through wireless or wired communication. While FIG. 6 shows the electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above functions defined by the methods of some embodiments of the present disclosure.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the electronic device, or a stand-alone computer readable medium without being assembled into the electronic device. The computer readable medium stores one or more programs. The one or more programs, when executed by the electronic device, cause the electronic device to: receiving a modeling request, the modeling request comprising training data, a model type, a target number, and an evaluation indicator; determining a target number of initial machine learning pipelines according to a type of the training data and the model type, the initial machine learning pipelines being used for model training; and executing following model generation steps using the target number of initial machine learning pipelines: generating the target number of new machine learning pipelines based on the target number of initial machine learning pipelines; performing model training based on the training data, the target number of initial machine learning pipelines, and the target number of new machine learning pipelines, to generate trained models; evaluating the obtained trained models respectively according to the evaluation indicator; determining whether a preset training termination condition is reached; and determining, in response to determining that the preset training termination condition is reached, a target trained model from the obtained trained models according to evaluation results.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including a receiving unit, a determining unit, and a generating unit. The names of the units do not constitute a limitation to such units themselves in some cases. For example, the receiving unit may be further described as "a unit configured to receive a modeling request."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating information, comprising:
receiving a modeling request, the modeling request comprising training data, a model type, a target number, and an evaluation indicator;
determining a target number of initial machine learning pipelines according to a type of the training data and the model type, the initial machine learning pipelines being used for model training; and
executing following model generation steps using the target number of initial machine learning pipelines: generating the target number of new machine learning pipelines based on the target number of initial machine learning pipelines; performing model training based on the training data, the target number of initial machine learning pipelines, and the target number of new machine learning pipelines, to generate trained models; evaluating the obtained trained models respectively according to the evaluation indicator; determining whether a preset training termination condition is reached; and determining, in response to determining that the preset training termination condition is reached, a target trained model from the obtained trained models according to evaluation results.

2. The method according to claim 1, wherein the method further comprises:
selecting, in response to determining that the preset training termination condition is not reached, the target number of machine learning pipelines from the target number of initial machine learning pipelines and the target number of new machine learning pipelines as new initial machine learning pipelines according to the evaluation results, and continuing to execute the model generation steps.

3. The method according to claim 1, wherein the method further comprises:
generating a model file for the target trained model, and evaluating the target trained model; and
pushing the model file and the evaluation result of the target trained model.

4. The method according to claim 1, wherein the modeling request further comprises a maximum number of iterations, and the training termination condition comprises:
a number of executions of the model generation steps reaches the maximum number of iterations; or
in response to determining that the number of the executions of the model generation steps does not reach the maximum number of iterations, and the evaluation result of an optimal trained model obtained by a preset number of continuous executions of the model generation steps is unchanged.

5. The method according to claim 1, wherein the generating the target number of new machine learning pipelines based on the target number of initial machine learning pipelines comprises:
selecting, according to a preset exchange ratio, initial machine learning pipelines from the target number of initial machine learning pipelines to form an initial machine learning pipeline subset, and executing following data exchange steps based on every two initial machine learning pipelines in the initial machine learning pipeline subset: determining whether two models corresponding to the two selected initial machine learning pipelines are the same; exchanging, in response to determining the same, model parameters of the two models to obtain two new machine learning pipelines; exchanging, in response to determining different, the models corresponding to the two selected initial machine learning pipelines to obtain two new machine learning pipelines; and
generating, for an initial machine learning pipeline in the target number of initial machine learning pipelines except the initial machine learning pipelines comprised in the initial machine learning pipeline subset, a new machine learning pipeline based on the excluded initial machine learning pipeline.

6. The method according to claim 1, wherein the generating the target number of new machine learning pipelines based on the target number of initial machine learning pipelines comprises:
selecting two initial machine learning pipelines from the target number of initial machine learning pipelines, and executing following data exchange steps: determining whether two models corresponding to the two selected initial machine learning pipelines are the same; exchanging, in response to the same, model parameters of the two models to obtain two new machine learning pipelines; exchanging, in response to determining different, the models corresponding to the two selected initial machine learning pipelines to obtain two new machine learning pipelines; and
selecting two initial machine learning pipelines that do not undergo the data exchange steps from the target number of initial machine learning pipelines, and continuing to execute the data exchange steps.

7. The method according to claim 1, wherein the initial machine learning pipeline comprises at least one data processing phase and one model training phase; and
the generating the target number of new machine learning pipelines based on the target number of initial machine learning pipelines comprises:
selecting, for a machine learning pipeline in the target number of initial machine learning pipelines, a preset number of parts of models corresponding to the at least one data processing phase and/or one model training phase of the initial machine learning pipeline for changing to generate a new machine learning pipeline.

8. An apparatus for generating information, comprising:
at least one processor; and
a memory storing instructions, the instructions when executed by the at least one processor, cause the at least one processor to perform operations, the operations comprising:
receiving a modeling request, the modeling request comprising training data, a model type, a target number, and an evaluation indicator;
determining a target number of initial machine learning pipelines according a type of the training data and the model type, the initial machine learning pipelines being used for model training; and
executing following model generation steps using the target number of initial machine learning pipelines: generating the target number of new machine learning pipelines based on the target number of initial machine learning pipelines; performing model training based on the training data, the target number of initial machine learning pipelines, and the target number of new machine learning pipelines, to generate trained models; evaluating the obtained trained models respectively according to the evaluation indicator; determining whether a preset training termination condition is reached; and determining, in response to determining that the preset training termination condition is reached, a target trained model from the obtained trained models according to evaluation results.

9. The apparatus according to claim 8, wherein the operations further comprise:

selecting, in response to determining that the preset training termination condition is not reached, the target number of machine learning pipelines from the target number of initial machine learning pipelines and the target number of new machine learning pipelines as new initial machine learning pipelines according to the evaluation results, and continuing to execute the model generation steps.

10. The apparatus according to claim 8, wherein the operations further comprise:

generating a model file for the target trained model, and evaluate the target trained model; and pushing the model file and the evaluation result of the target trained model.

11. The apparatus according to claim 8, wherein the modeling request further comprises a maximum number of iterations, and the training termination condition comprises:

a number of executions of the model generation steps reaches the maximum number of iterations; or in response to determining that the number of the executions of the model generation steps does not reach the maximum number of iterations, and the evaluation result of an optimal trained model obtained by a preset number of continuous executions of the model generation steps is unchanged.

12. The apparatus according to claim 8, wherein the generating the target number of new machine learning pipelines based on the target number of initial machine learning pipelines comprises:

selecting, according to a preset exchange ratio, initial machine learning pipelines from the target number of initial machine learning pipelines to form an initial machine learning pipeline subset, and executing following data exchange steps based on every two initial machine learning pipelines in the initial machine learning pipeline subset: determining whether two models corresponding to the two selected initial machine learning pipelines are the same; exchanging, in response to determining the same, model parameters of the two models to obtain two new machine learning pipelines; exchanging, in response to determining different, the models corresponding to the two selected initial machine learning pipelines to obtain two new machine learning pipelines; and generating, for an initial machine learning pipeline in the target number of initial machine learning pipelines except the initial machine learning pipelines comprised in the initial machine learning pipeline subset, a new machine learning pipeline based on the excluded initial machine learning pipeline.

13. The apparatus according to claim 8, wherein the generating the target number of new machine learning pipelines based on the target number of initial machine learning pipelines comprises:

selecting two initial machine learning pipelines from the target number of initial machine learning pipelines, and execute following data exchange steps: determining whether two models corresponding to the two selected initial machine learning pipelines are the same; exchanging, in response to the same, model parameters of the two models to obtain two new machine learning pipelines; exchanging, in response to determining different, the models corresponding to the two selected initial machine learning pipelines to obtain two new machine learning pipelines; and selecting two initial machine learning pipelines that do not undergo the data exchange steps from the target number of initial machine learning pipelines, and continuing to execute the data exchange steps.

14. The apparatus according to claim 8, wherein the initial machine learning pipeline comprises at least one data processing phase and one model training phase; and the generating the target number of new machine learning pipelines based on the target number of initial machine learning pipelines comprises:

selecting, for a machine learning pipeline in the target number of initial machine learning pipelines, a preset number of parts of models corresponding to the at least one data processing phase and/or one model training phase of the initial machine learning pipeline for changing to generate a new machine learning pipeline.

15. A non-transitory computer readable medium storing a computer program, wherein the computer program, when executed by a processor, causes the processor to perform operations, the operations comprising:

receiving a modeling request, the modeling request comprising training data, a model type, a target number, and an evaluation indicator;

determining a target number of initial machine learning pipelines according a type of the training data and the model type, the initial machine learning pipelines being used for model training; and executing following model generation steps using the target number of initial machine learning pipelines: generating the target number of new machine learning pipelines based on the target number of initial machine learning pipelines; performing model training based on the training data, the target number of initial machine learning pipelines, and the target number of new machine learning pipelines, to generate trained models; evaluating the obtained trained models respectively according to the evaluation indicator; determining whether a preset training termination condition is reached; and determining, in response to determining that the preset training termination condition is reached, a target trained model from the obtained trained models according to evaluation results.

\* \* \* \* \*